US006597204B2

United States Patent
Imamura (10) Patent No.: US 6,597,204 B2
(45) Date of Patent: Jul. 22, 2003

(54) CLOCK INTERRUPTION DETECTION CIRCUIT

(75) Inventor: Masahiro Imamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/986,761

(22) Filed: Nov. 9, 2001

(65) Prior Publication Data

US 2002/0084822 A1 Jul. 4, 2002

(30) Foreign Application Priority Data

Nov. 10, 2000 (JP) ........................................ 2000-343984

(51) Int. Cl.[7] ................................................. H03K 5/19
(52) U.S. Cl. .............................. 327/20; 327/47; 327/18
(58) Field of Search ............................ 327/292, 18, 20, 327/14, 39, 40, 43–47, 176, 293, 294

(56) References Cited

U.S. PATENT DOCUMENTS

| | | | | | |
|---|---|---|---|---|---|
| 4,737,723 A | * | 4/1988 | Mita | ............................ | 327/20 |
| 4,920,540 A | * | 4/1990 | Baty | ............................ | 371/61 |
| 4,949,052 A | * | 8/1990 | Chigira | ........................ | 331/49 |
| 5,561,390 A | * | 10/1996 | Hiiragizawa | ................ | 327/147 |
| 5,570,382 A | * | 10/1996 | Miyamoto | .................... | 371/61 |
| 5,619,643 A | * | 4/1997 | Moroni et al. | ......... | 395/182.21 |
| 5,828,243 A | * | 10/1998 | Bagley | ........................ | 327/99 |
| 5,832,033 A | * | 11/1998 | Takahasi | ..................... | 375/289 |
| 5,903,748 A | * | 5/1999 | McCollough et al. | ....... | 395/558 |
| 5,936,452 A | * | 8/1999 | Utsuno et al. | .............. | 327/292 |
| 5,969,558 A | * | 10/1999 | Abe | ............................ | 327/292 |
| 6,121,805 A | * | 9/2000 | Thamsirianunt et al. | .... | 327/175 |
| 6,163,172 A | * | 12/2000 | Bazuin et al. | ................ | 326/93 |
| 6,246,261 B1 | * | 6/2001 | Monceau | .................... | 326/46 |
| 6,313,681 B1 | * | 11/2001 | Yoshikawa | ................... | 327/277 |
| 6,333,646 B1 | * | 12/2001 | Tsuzuki | ........................ | 327/47 |
| 6,343,334 B1 | * | 1/2002 | Uemura et al. | ................ | 710/8 |

FOREIGN PATENT DOCUMENTS

| | | |
|---|---|---|
| JP | 48-28093 | 8/1973 |
| JP | 54-32040 | 3/1979 |
| JP | 62-77653 | 4/1987 |
| JP | 1-171316 | 7/1989 |
| JP | 03-314570 | 11/1991 |
| JP | 5-189078 | 7/1993 |
| JP | 11-220330 | 8/1999 |

* cited by examiner

Primary Examiner—Timothy P. Callahan
Assistant Examiner—Hai L. Nguyen
(74) Attorney, Agent, or Firm—Whitham, Curtis & Christofferson, PC (57) ABSTRACT

A clock interruption detection circuit comprises a frequency divider circuit for outputting a plurality of frequency divided clocks by dividing an input clock with different division values, an AND circuit for ANDing the input clock and the plurality of frequency divided clocks, an inverter for inverting one of the frequency divided clocks with the largest division value, another AND circuit for ANDing the input clock, the rest of the frequency divided clocks and the output of the inverter, a first and a second switch with a control terminal supplied with the output of each of the AND circuits for controlling the on/off of a discharge path of a first and a second capacitor, a first and a second waveform-shaping buffer circuit supplied with a terminal voltage of the first and the second capacitor, and a selection circuit for selecting one of the outputs of the first and second waveform-shaping buffer circuits in accordance with a selection control signal obtained by delaying the output of the inverter by a predetermined length of time in a delay circuit. The clock interruption detection circuit enables a clock interruption to be detected by a single system of input clock, makes integration easier and allows the clock interruption time to be detected accurately.

12 Claims, 8 Drawing Sheets

CLOCK INTERRUPTION DETECTION CIRCUIT

BACKGROUND OF THE INVENTION

1. Field of the Invention

The present invention relates to a clock interruption detection circuit, and particularly to a clock interruption detection circuit suitable for fabrication in a semiconductor integrated circuit.

2. Description of the Prior Art

A clock interruption detection circuit receives an external clock and, upon detecting an absence of the clock, operates to fix the operation of a logic circuit operating in synchronism with the clock, in order to prevent an abnormal operation of the logic circuit.

In the prior art, such clock interruption detection circuit is generally constructed in several ways. One is where two systems of external clock signals are input and the interruption of either clock signal is detected. Another is based an the use of a free-running oscillator (i.e., there are two clock systems) in order to detect clock interruption. Still another example employs an analog integrating circuit (which is mounted externally to the semiconductor IC) whose outputs are compared in two comparators to detect clock interruption.

However, there is a growing need to use a single system of clock signal and to fabricate the clock interruption circuit in an LSI.

Figure 8:
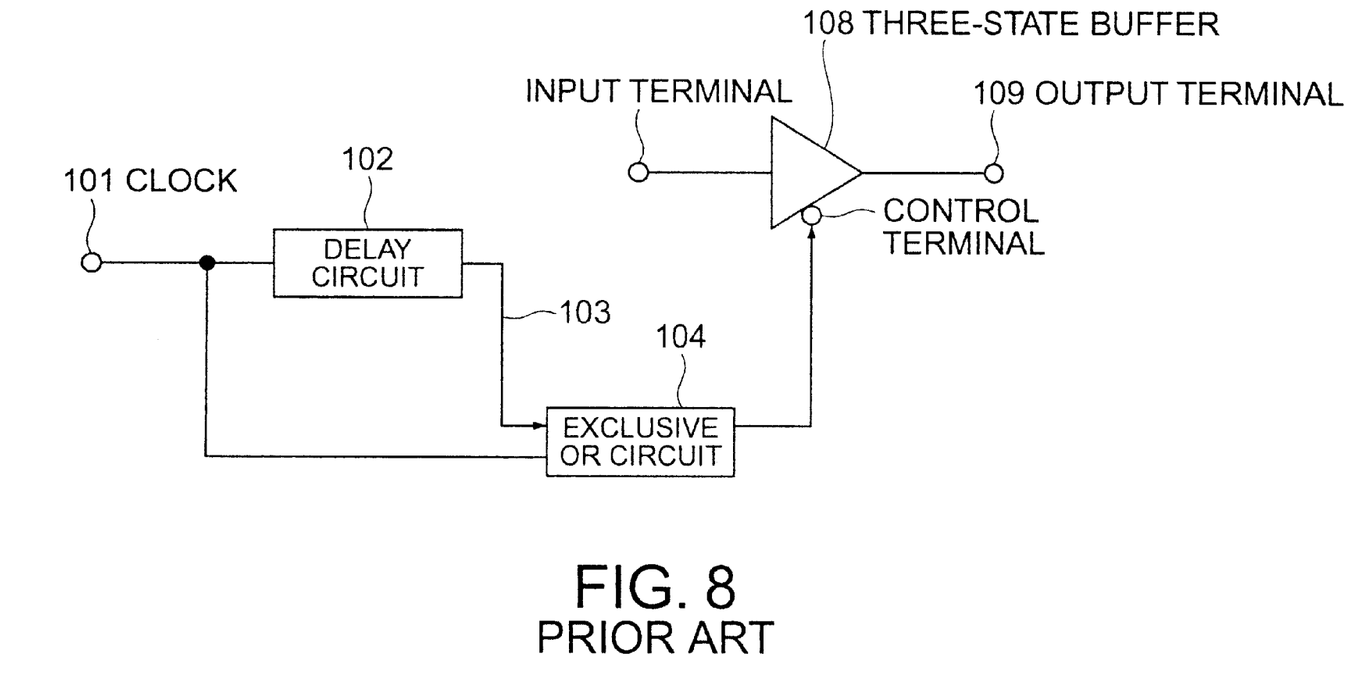
FIG. 8 shows a block diagram of a clock interruption detection circuit according to the prior art.

To respond to such needs, Japanese Unexamined Patent Publication No. H5-153102 proposes a stable clock interruption detection circuit as shown in FIG. 8. This clock interruption detection circuit is based on a combination of a delay circuit and logic circuits whereby the size of the apparatus can be minimized by integration, the adjustment of the elements is unnecessary and there is no deterioration with time.

Referring to FIG. 8, the clock interruption detection circuit according to the above-mentioned disclosure comprises a delay circuit 102 for delaying a clock 101, an exclusive OR circuit 104 for exclusively ORing the clock and an output 103 of the delay circuit 102, and a three-state buffer 108. The three-state buffer 108 has its output control terminal connected to the output of the exclusive OR circuit 104. When the output of the exclusive OR circuit 104 is at a high level, the output of the three-slate buffer 108 is enabled. When the output of the OR circuit is at a low level, the output of the three-state buffer 108 assumes a high-impedance state. In the event of a clock signal loss, the voltage at the output terminal of the three-state buffer 108 decreases in the high-impedance state, thereby allowing the clock interruption to be detected.

However, in this clock interruption detection circuit shown in FIG. 8, with regard to the relationship between the delay time in the delay circuit 102 and the clock interruption detection time (a reference duration of time for the determination of clock interruption in the absence of the clock signal), the detection time must by designed by the leak current of the three-state buffer 108. Accordingly, the clock interruption detection time varies depending on the value of the leak current of the three-state buffer 108. It is also necessary to provide a capacitor at the output terminal 109 so as to fix the output level.

SUMMARY OF THE INVENTION

In view of the foregoing problems of the prior art, it is an object of the present invention to provide a clock interruption detection circuit which can detect clock interruption by using a single system of input clock, which is suitable for integration and which can set the clock interruption detection time with precision.

The object of the invention is achieved by a clock interruption detection circuit according to the present invention comprising:

a circuit for generating a first and a second signal, the first signal formed by a pulse signal synchronized with a leading edge of a frequency divided clock which is obtained by frequency-dividing an input clock in a frequency divider with a predetermined division value, the second signal being formed by a pulse signal synchronized with a trailing edge of the frequency divided clock;

a first and a second switch with a control terminal supplied with the first and the second signal, respectively, the first and said second switches controlling the on/off of a discharge path of a first and a second capacitor which are charged by a power supply, wherein the first and the second capacitors are charged by the power supply when the first and the second switched are turned off, respectively;

a first and a second waveform-shaping buffer circuit which are supplied with a terminal voltage of the first and the second capacitor, respectively; and a circuit for selectively outputting one of outputs of the first and the second waveform-shaping buffer circuit.

The first and second capacitors may preferably be charged when the first and second switches are turned off by the power supply via a first and a second resistor. The time constant of terminal voltage increase during the charging of the capacitors is determined by the resistance values of the resistors and the capacitance of the capacitors.

In another aspect of the present invention, the clock interruption detection circuit comprises:

a frequency division circuit for outputting a plurality of frequency divided clocks by dividing an input clock with different division values;

a first AND circuit for ANDing the input clock and the plurality of frequency divided clocks;

an inverter for inverting one of the frequency divided clocks with the largest division value, a second AND circuit for ANDing the input clock, the frequency divided clock(s) other than the frequency divided clock with the largest division value and the output of the inverter;

a first switch with a control terminal supplied with the output of the first AND circuit for controlling the on/off of a discharge path of a first capacitor;

a second switch with a control terminal supplied with the output of the second AND circuit for controlling the on/off of a discharge path of a second capacitor;

a first waveform-shaping buffer circuit supplied with a terminal voltage of the first capacitor;

a second waveform-shaping buffer circuit supplied with a terminal voltage of the second capacitor; and a selection circuit supplied with the outputs of the first and second waveform-shaping buffer circuits for selectively outputting one of these outputs based on a selection control signal obtained by delaying the output of the inverter by a predetermined length of time in the frequency divided clock signal with the largest division value (or the output of the inverter) by a predetermined length of time in the delay circuit.

In a yet another aspect of the present invention, the clock interruption detection circuit comprises:

a frequency divider circuit supplied with an input clock for generating a frequency divided clock with a predetermined division value;

a first AND circuit for ANDing the input clock and the frequency divided clock;

an inverter for inverting the frequency divided clock;

a second AND circuit for ANDing the input clock and the output of the inverter;

a first and a second switch with a control terminal supplied with the outputs of the first and second AND circuits for controlling the on/off of a discharge path of a first and a second capacitor;

a first and a second waveform-shaping buffer circuit supplied with a terminal voltage of the first and the second capacitor; and a selection circuit supplied with the outputs of the first and second waveform-shaping buffer circuits for selecting and outputting one of those outputs in accordance with a selection control signal obtained by delaying the output of the inverter for a predetermined length of time by the delay circuit.

As a first advantageous effect of the present invention, the interruption of the clock can be detected without providing an oscillator other than the input clock.

This is because of the fact that the present invention comprises two CR circuits so that when a clock interruption occurs, either one of the capacitors is always charged, which allows the clock interruption to be detected without providing the oscillator other than the input clock.

A second advantageous effect of the present invention is that an increase in the chip area can be minimized when the clock interruption detection circuit is fabricated in an LSI.

This is because of the use of the Schmitt trigger buffers instead of analog circuitry such as comparators in the present invention for the detection of the output voltage level.

A third advantageous effect of the present invention is that the time for detecting the clock interruption can be precisely set even when the clock interruption detection circuit is fabricated in an LSI and when the capacitors or resistance values are varied within the CR circuits. This is because in the present invention, the outputs of the CR circuits are switched by the selector at intervals of a plurality of periods of the input clock, which makes it possible to set the time constant of the CR circuits above the plurality of clock periods.

BRIEF DESCRIPTION OF THE DRAWINGS

The present invention will be more fully understood from the following description of preferred embodiments when read in conjunction with the attached drawings, in which.

DESCRIPTION OF THE PREFERRED EMBODIMENTS

Figure 1:
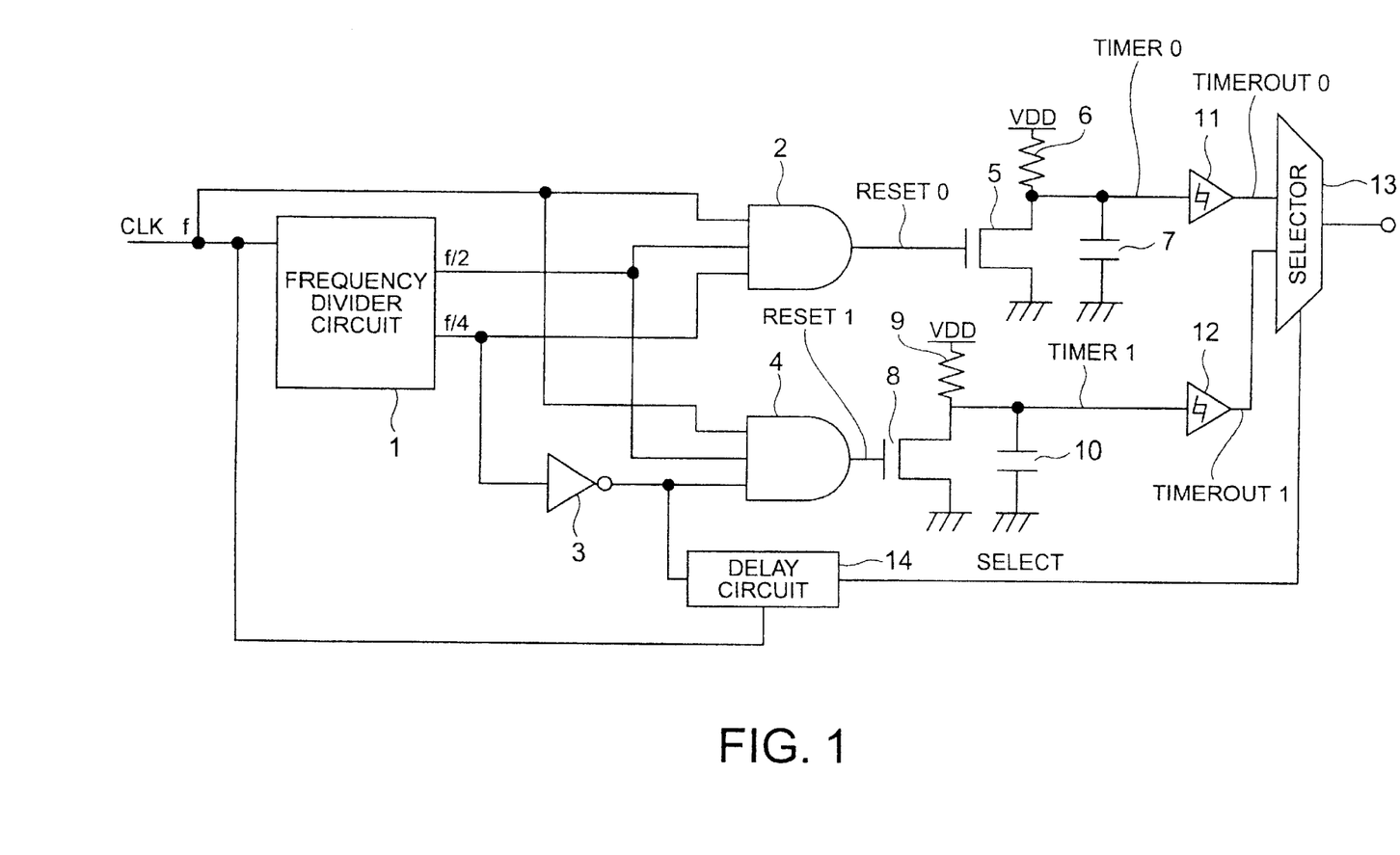
FIG. 1 is a diagram of a first embodiment of the present invention.

FIG. 1 shows a clock interruption detection circuit according to a first embodiment of the present invention. The clock interruption detection circuit comprises a frequency divider circuit 1 for dividing an input clock CLK by 2 and 4. The clock interruption detection circuit further comprises a three-input AND circuit 2 for ANDing the input clock CLK and the ½ and ¼ frequency divided clocks, and an inverter 3 for inverting the ¼ frequency divided clock. The clock interruption detection circuit also comprises a second three-input AND circuit 4 for ANDing the ¼ clock inverted signal, the input clock and the ½ frequency divided clock. The AND circuits 2, 4 each output a pulse signal (with a pulse width of ½ of the period of the input clock) synchronized with a leading edge and a trailing edge, respectively, of the ¼ clock at a ¼ frequency of the input clock (i.e., with a period which is four times that of the input clock).

The output of the AND circuit 2 is fed to the gate of an N-channel MOS transistor 5 whose drain is connected to a power supply VDD via a resistor (load element) 6 and whose source is connected to ground. On the other hand, the output of the AND circuit 4 is fed to the gate of another N-channel MOS transistor 8 whose drain is connected to the power supply VDD via a resistor 9 and whose source is connected to ground. A capacitor 7, 10 is connected across the drain of each of the N-channel MOS transistors 5 and 8 and ground. A drain voltage of each of the N-channel MOS transistors 5, 8 is fed to an input terminal of each of Schmitt trigger buffers 11, 12. One of the outputs of the Schmitt trigger buffers 11, 12 is selected and output by a selector 13 to which the output of the inverter 3 is fed as a selection control signal.

When the output (RESET0) of the AND circuit 2 is at a high level, the MOS switch 5 turns on, thereby discharging the electric charge stored in the capacitor 7. Conversely, when the output of the AND circuit 2 is at a low level, the MOS switch 5 turns off, thereby allowing the capacitor 7 to be charged by the power supply via the resistor 6. It should be noted that a P-channel MOS transistor may be connected such that its source is connected to the end of the resistor 6 which is not connected to the power supply, the output (RESET0) of the AND circuit 2 is connected to its gate, and its drain is connected to the drain of the N-channel MOS transistor 5.

Likewise, when the output (RESET1) of the AND circuit 4 is at a high level, the MOS switch 8 turns on. Thereby discharging the electric charge stored in the capacitor 10. When the output of the AND circuit 4 is at a low level, the MOS switch 8 turns off, thereby allowing the capacitor 10 to be charged by the power supply via the resistor 9. It should be again noted that a P-channel MOS transistor may be connected such that its source is connected to the end of the resistor 9 which is not connected to the power supply, the output (RESET1) of the AND circuit 4 is connected to its gate, and its drain is connected to the drain of the N-channel MOS transistor 8. The values of the resistors 8, 9 are determined on the basis of a time constant (of CR circuits) which is determined by the product of the resistor values and the capacitance values of the capacitors 7, 10, and the clock period of the input clock. The time constant of the CR circuits is set at a value corresponding to a plurality of clock cycles such that a clock interruption can be determined when the MOS switches 5, 8 are turned off for the duration of a plurality of clock periods. It goes without saying that, when the clock interruption detection circuit is fabricated in a semiconductor integrated circuit, the capacitors 7, 10 may be formed by load capacitance (parasitic capacitance), for example, at the junction nodes between the drains of the MOS switches 5, 8 and the buffers 11, 12, as long as the condition is met that the time constant of the CR circuits corresponds to a plurality of clock cycles.

When the clock CLK has stopped (i.e., when the MOS switches 5, 8 are turned off continuously for the duration of a plurality of clock periods), one of the terminal voltages TIMER0, TIMER1 of the capacitors 7, 10, which are charged by the power supply with a predetermined time constant, exceeds a detection level (threshold) of the Schmitt trigger buffers 11, 12. As a result, one of the outputs TIMEROUT0, TIMEROUT1 assumes a high level.

The selector 13 for selecting one of the outputs of the Schmitt trigger buffers 11, 12 is switched in accordance with the output of the delay circuit 14. The delay circuit 14 delays by one clock the output signal from the inverter 3 which inverts the ¼ frequency divided clock signal.

When the P-channel MOS transistors are connected between the resistors connected to the power supply and the drains of the N-channel MOS transistors 5, 8 as mentioned above, the P-channel MOS transistors turn on when the outputs RESET0, RESET1 are at a low level, thereby charging the capacitors 7, 10 with a constant current, while turning off when the outputs RESET0, RESET1 are at a high level.

The delay circuit 14 may be formed by any known delay circuit as long as it is capable of delaying the signal inverted by the inverter 3 by one clock cycle of the input clock CLK being supplied. The delay time is not necessarily limited to the one clock, since the delay time is intended to provide a timing leeway from the point of transition of the clock for the selection of the buffers 11, 12.

The output of the delay circuit 14 is fed to the selector 13 as the selection control signal SELECT. The selector 13 outputs the input from the Schmitt trigger buffer 12 when the output of the delay circuit 14 is at a high level, while outputting the input from the Schmitt trigger buffer 11 when the output of the delay circuit 14 is at a low level.

Figure 2:
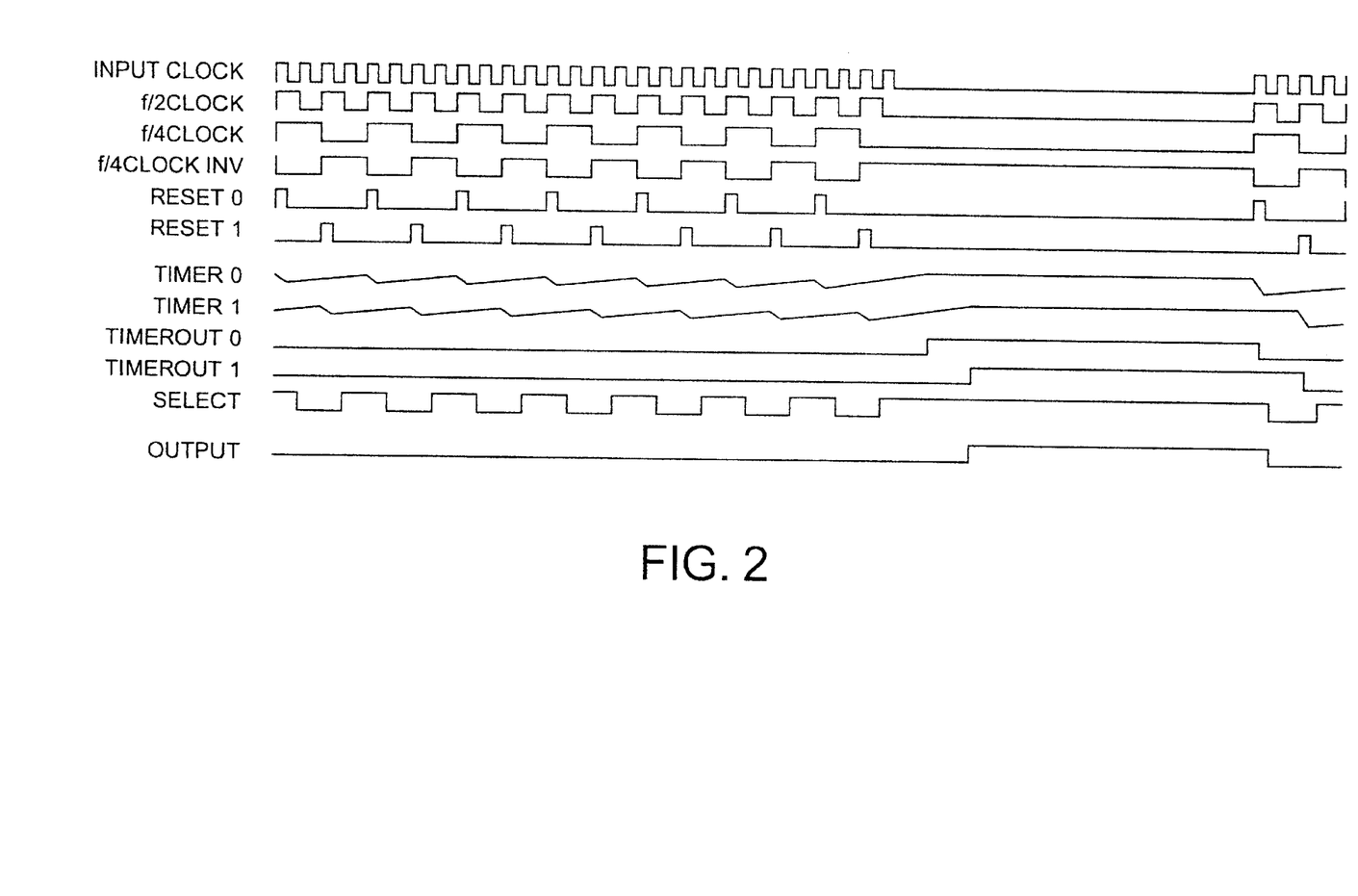
FIG. 2 shows timing waveforms at major nodes in the first embodiment.

Now referring to FIG. 2 showing the operational timing chart of the first embodiment of the present invention shown in FIG. 1, INPUT CLOCK designates the input clock CLK, F/2 CLOCK and F/4 CLOCK the outputs of the frequency divider circuit 1, F/4 CLOCK INV the output of the inverter 3, RESET0 and RESET1 the outputs of the AND circuits 2, 4. TIMER0 and TIMER1 the terminal voltages of the capacitors 7, 10, TIMEROUT0, TIMEROUT1 the outputs of the buffer circuits 11, 12, SELECT the output of the delay circuit 14, and OUTPUT the output (clock interruption signal) of the selector 13.

When the clock is being input normally, the frequency divider circuit 1 outputs the signals with the ½ and ¼ frequencies of the input clock frequency. The input clock and the two outputs of the frequency divider circuit 1 are ANDed in the AND circuit 2, which outputs a pulse with a ¼ the frequency of the input clock and a pulse width which is one half the period of the input clock. This waveform is shown as RESET0. The pulse is fed to the gate of the MOS switch 5, which turns on when the pulse is at a high level, thereby discharging the electric charge stored in the capacitor 7. Conversely, when the pulse is at a low level, the MOS switch 5 turns off, thereby charging the capacitor 7 via the resistor 6. The terminal voltage of the capacitor 7 is shown as TIMER0.

The terminal voltage of the capacitor 7 is fed to the Schmitt trigger buffer 11, which monitors the input voltage and produces a high level output when the threshold is exceeded.

On the other hand, the output of the inverter 3 inverting the ¼ frequency from the frequency divider circuit 1, the input clock and the ½ frequency divided clock from the frequency divider circuit 1 are ANDed in the AND circuit 4, whose output waveform is shown as RESET1. This pulse is fed to the gate of the MOS switch 8, which turns on when the pulse is at a high level, thereby discharging the electric charge stored in the capacitor 10. Conversely, when the pulse is at a low level, the MOS switch 8 turns off, thereby charging the capacitor 10 via the resistor 9. The terminal voltage of the capacitor 10, shown as TIMER1, is fed to the Schmitt Trigger buffer 12, which monitors the input voltage and produces a high-level output when the threshold is exceeded.

The outputs of the Schmitt trigger buffers 11, 12 are fed to the selector 13. The selector 13 also receives the output of the delay circuit 14 as the selection control signal SELECT for determining which of the inputs from the Schmitt trigger buffers is to be output. The output of the delay circuit 14 is the result of delaying the output of the inverter 3 by one period of the input clock.

When the signal SELECT is at a high level, the selector 13 outputs the output of the Schmitt trigger buffer 12; and when the signal SELECT is at a low level, the selector 13 outputs the output of the Schmitt trigger buffer 11.

When the input of the clock signal INPUT CLOCK resumed after an interruption of the clock signal, the selector 13 being supplied with the output of the delay circuit 14 as the selection control signal SELECT receives the selection control signal SELECT that has translated to a low level as shown in FIG. 2, thereby selecting the output TIMEROUT0 (low level) of the buffer 11, thus notifying that the clock interruption state has been resolved.

Figure 5A:
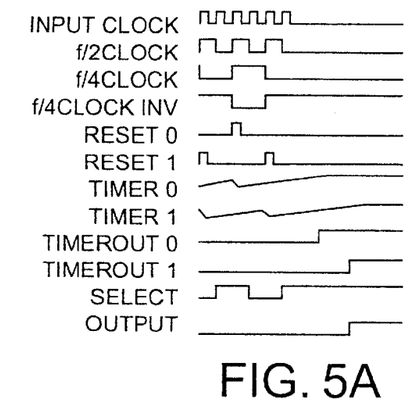
FIGS. 5A through 5H show timing waveforms at major nodes of the first embodiment illustrating a plurality of cases where the clock signal was interrupted.
Figure 5B:
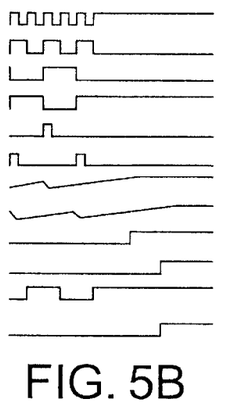
Figure 5C:
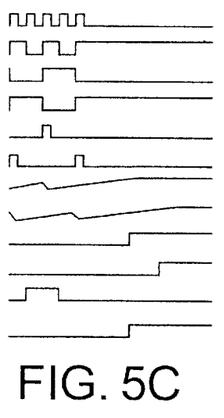
Figure 5D:
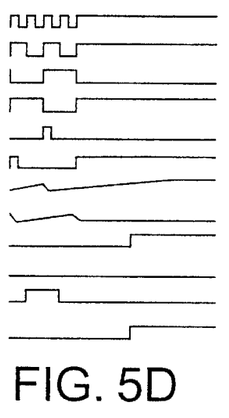
Figure 5E:
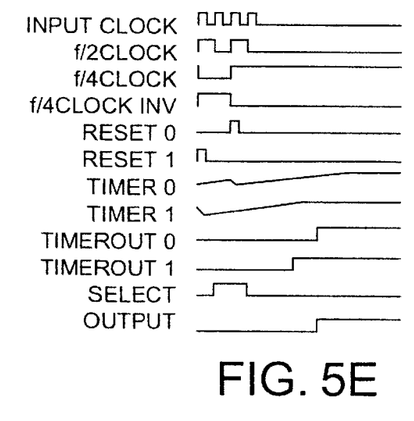
Figure 5F:
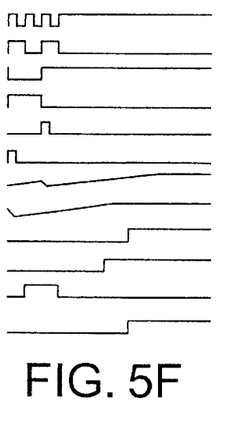
Figure 5G:
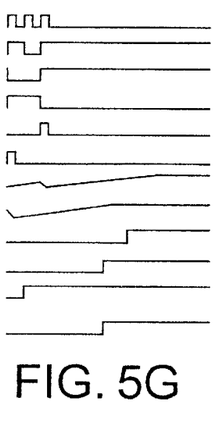
Figure 5H:
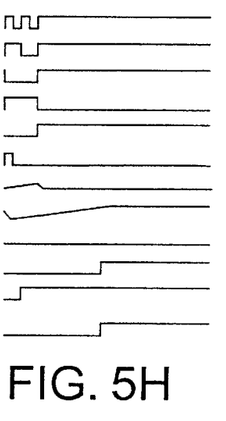

FIGS. 5A through 5H show voltages at various points of the circuit when the clock has stopped at various phases. As shown, no matter which phase the clock has stopped at, the clock interruption signal can be output. FIGS. 5A and 5B show the cases where the clock has stopped at the fall and the rise portion, respectively, of the sixth clock. FIGS. 5C and 5D show the cases where the clock has stopped at the fall and the rise portion, respectively, of the fifth clock. FIGS. 5E and 5F show the cases where the cluck has stopped at the fall and the rise portion, respectively, of the fourth clock. FIGS. 5G and 5H show the cases where the clock has stopped at the fall and the rise portion, respectively, of the third clock. In any of these cases, the selector 13 outputs a high-level signal of one of the outputs TIMEROUT0, TIMEROUT1 from the buffers selected by the selection control signal SELECT, thus indicating a clock interruption. After the termination of the clock INPUT CLOCK, the selector 13 outputs a high-level output indicating the clock interruption within a period corresponding to tour clock cycles (the clock period of F/4 CLOCK).

Figure 3:
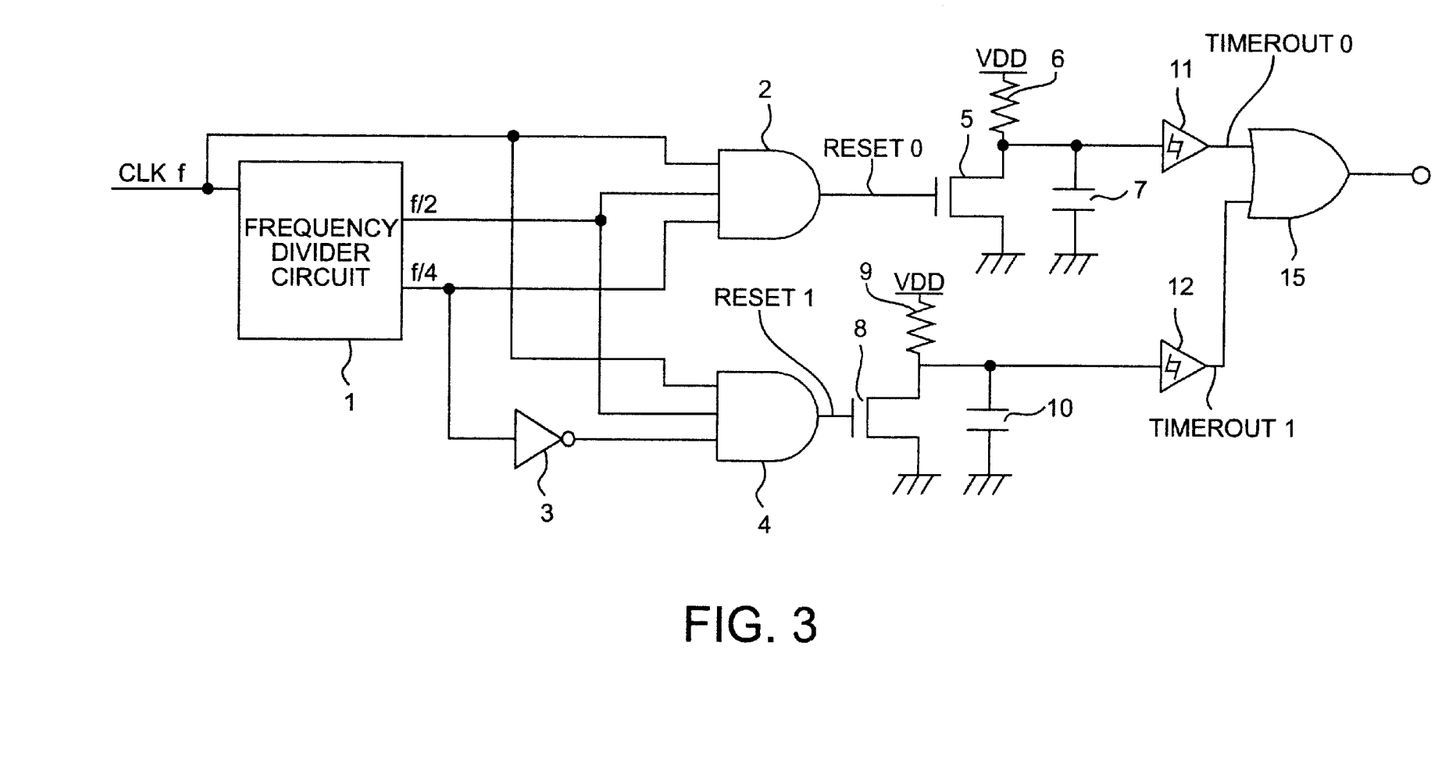
FIG. 3 shows a second embodiment of the present invention.

Hereafter, a second embodiment of the present invention will be described. The second embodiment differs from the first embodiment in the manner in which the output of the clock interruption detection circuit is output. FIG. 3 shows the structure of the second embodiment. As shown, the outputs of the two Schmitt trigger buffers 11, 12 are ORed in an OR circuit 15 whose output is used as the output of the clock interruption detection circuit.

Figure 4:
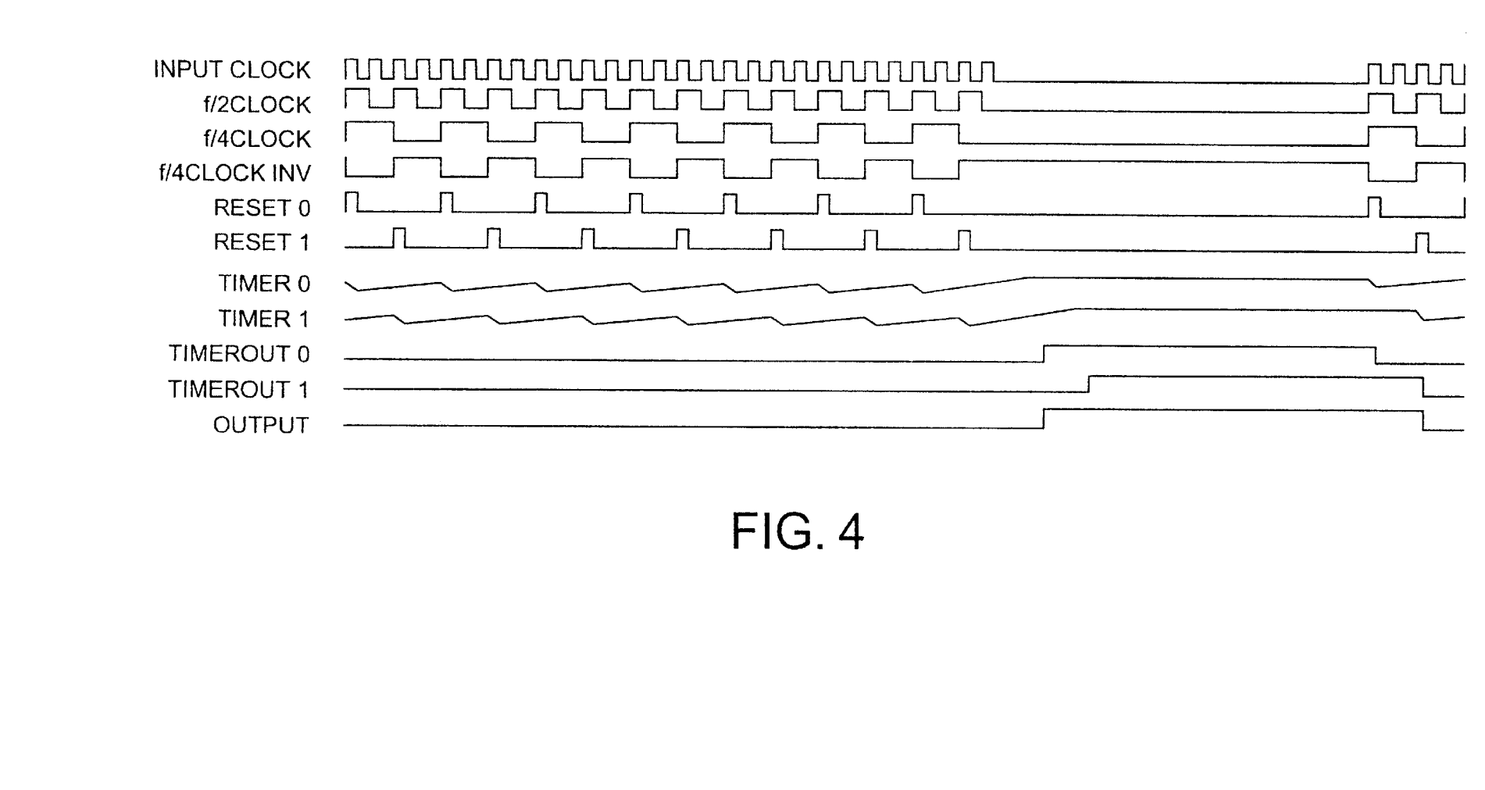
FIG. 4 shows timing waveforms at major nodes of the second embodiment.

FIG. 4 shows the timing chart of the clock interruption detection circuit using the OR circuit 15. A clock interruption is detected when one of the output voltages from the two CR circuits (each consisting of a resistor 6, 9 and a capacitor 7, 10) exceeded an inversion level of the Schmitt trigger buffers 11, 12. In this embodiment, the delay circuit 14 is also omitted.

Alternatively, both the rise and fall edges of the input clock CLK may be employed, and the frequency divider circuit 1 may output only the ½ frequency divided signal so that the inverter 3 is fed with only the ½ frequency divided signal. Similar effects can be obtained also by making the delay time in the delay circuit 14 one half (½ clock period) the input clock CLK.

Figure 6:
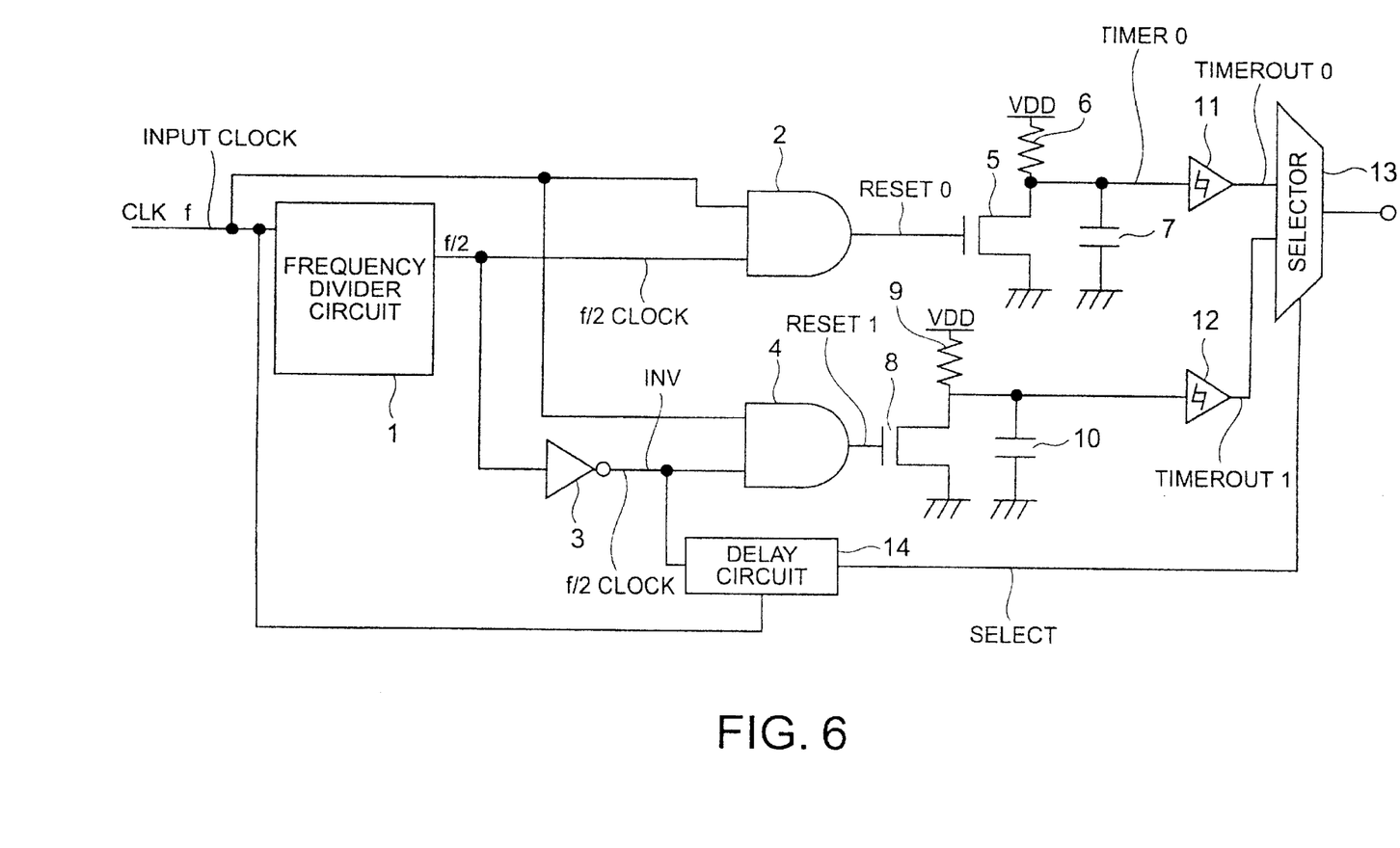
FIG. 6 shows a third embodiment of the present invention.
Figure 7:
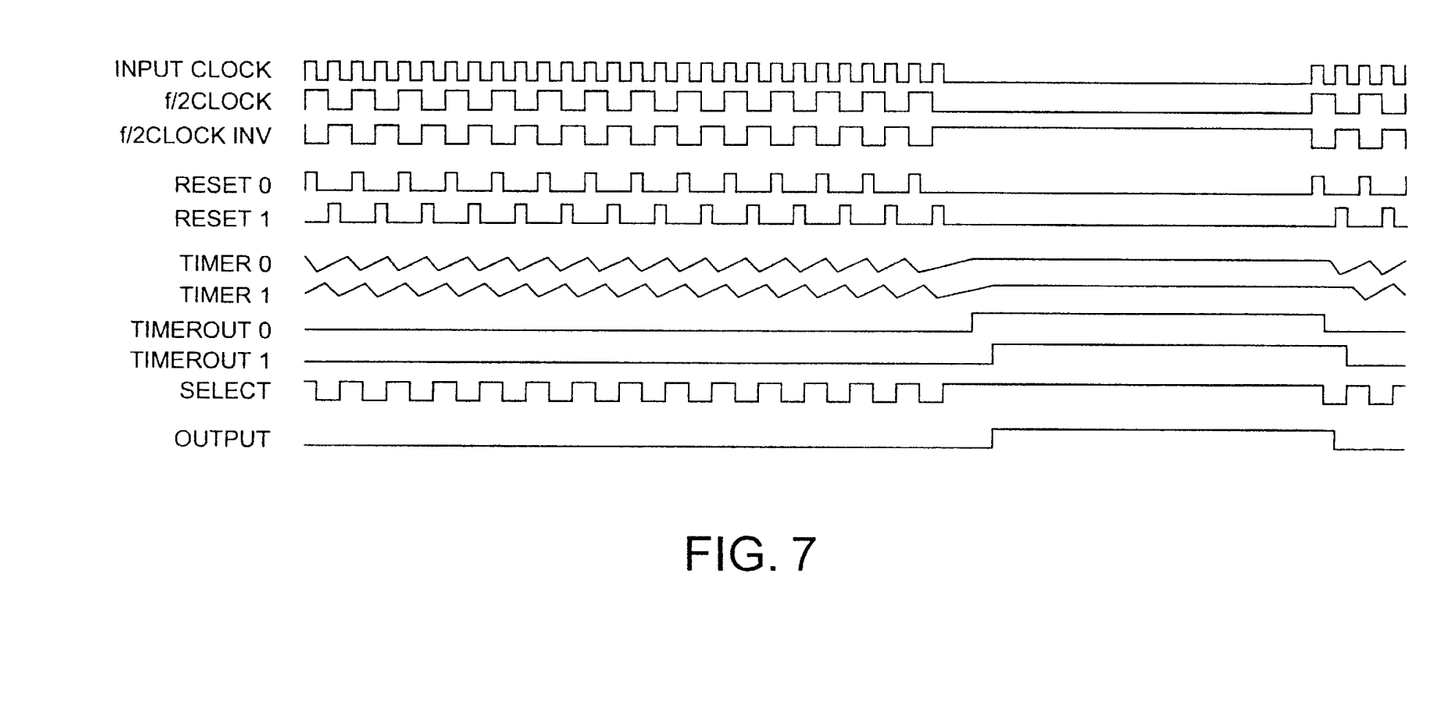
FIG. 7 shows timing waveforms at major nodes of the third embodiment.

FIG. 6 shows a third embodiment of the present invention. FIG. 7 shows a timing chart of the third embodiment. In the third embodiment, the frequency divider circuit produces only the ½ frequency divided clock, thereby reducing the number of outputs of the frequency divider circuit 1 compared with the first and second embodiments.

The frequency divider circuit 1 receives the input clock CLK and produces the ½ frequency divided clock. The input clock and the ½ frequency divided clock are ANDed in an AND circuit 2. The ½ frequency divided clock is also inverted by an inverter 3, whose output is ANDed with the input clock CLK in another AND circuit 4. The ½ frequency divided clock inverted by the inverter 3 is further delayed in a delay circuit 14 by one half the clock period (i.e., one half of the input clock period). The thus delayed ½ frequency divided signal is fed to a selection circuit 13 as a selection control signal SELECT.

While in the above embodiments, the frequency divider circuit 1 produced the frequency divided clocks with the division ratios of ½ and/or ¼, these are merely exemplary and not to be taken as limiting the scope of the present invention. For example, the frequency divider circuit may output ⅛ and ¹⁄₁₆ or other ½ to the nth power) frequency divided clocks, and they may be ANDed with the input clock to drive the gate of the MOS switch. One of the outputs of the frequency divider circuit with the largest division value may be inverted by the inverter and ANDed with the rest of the outputs of the frequency divider circuit together with the input clock, and the result may be used to drive the gate of the other MOS switch. Similar effects can be obtained by feeding the signal with the largest division value to the delay circuit 14 and delaying it by one clock.

What is claimed is:

1. A clock interruption detection circuit comprising:
    a circuit for generating, on the basis of an input clock, a first and a second signal with a period which is a predetermined multiple of a clock period of said input clock, said first and second signals being out of phase to each other by one half of said predetermined multiple of said clock period of said input clock;
    a first switch connected between one end of a first capacitor whose other end is connected to a first power supply said first switch having a control terminal which is supplied with said first signal and thereby being on/off controlled;
    a second switch connected between one end of a second capacitor whose other end is connected to said first power supply said second switch having a control terminal which is supplied with said second signal and thereby being on/off controlled, wherein said first and second capacitors have their respective one ends connected to a second power supply via a resistor element;
    a first and a second waveform-shaping buffer circuit with an input terminal connected to each one end of said first and second capacitors; and
    a circuit for selectively outputting one of outputs of said first and second waveform-shaping buffer circuits.

2. A clock interruption detection circuit comprising:
    a circuit for generating a first and a second signal, said first signal formed by a pulse signal synchronized with a leading edge of a frequency divided clock which is obtained by frequency-dividing an input clock in a frequency divider with a predetermined division value, said second signal being formed by a pulse signal synchronized with a trailing edge of said frequency divided clock;
    a first and a second switch with a control terminal supplied with said first and said second signal, respectively, said first and second switches controlling the on/off of a discharge path of a first and a second capacitor, respectively, which are charged by a power supply, wherein said first and said second capacitors are charged by the power supply when said first and said second switches, respectively, are turned off;
    a first and a second waveform-shaping buffer circuit supplied with a terminal voltage of said first and said second capacitor, respectively, and
    a circuit for selectively outputting one of outputs of said first and second waveform-shaping buffer circuits.

3. The clock interruption detection circuit according to claim 2, wherein said first and second capacitors are charged when said first and said second switches are turned off, respectively, with a predetermined time constant which is determined by the resistance of said first and said second resistor connected between said power supply and said first and said second capacitor, respectively, and the capacitance of said first and said second capacitor.

4. The clock interruption detection circuit according to any one of claims 1–3, wherein said circuit for selectively outputting one of the outputs of said first and second waveform-shaping buffer circuits comprises an OR circuit which ORs the output signals from said first and second waveform-shaping buffer circuits.

5. The clock interruption detection circuit according to any one of claims 1–4, wherein said circuit for generating said first and second signals comprises:
    a frequency divider circuit for outputting a plurality of frequency divided clocks by dividing the input clock by different division values;
    a first AND circuit for ANDing said input clock and the plurality of frequency divided clocks and outputting the result of the operation as the first signal;
    an inverter for inverting one of the frequency divided clocks with the largest division value; and
    a second AND circuit for ANDing said input clock, the frequency divided clock(s) with the division value(s) other than the largest division value and the output of said inverter, and outputting the result of the operation as said second signal.

6. The clock interruption detection circuit according to claim 5, wherein the circuit for selectively outputting one of the outputs of the first and second waveform-shaping buffer circuits performs the selection based on a signal obtained by delaying the frequency divided clock with the largest division value by a predetermined length of time in a delay circuit.

7. A clock interruption detection circuit comprising:

a frequency division circuit for outputting a plurality of frequency divided clocks by dividing an input clock with different division values;

a first AND circuit for ANDing said input clock and the plurality of frequency divided clocks;

an inverter for inverting one of the frequency divided clocks with the largest division value;

a second AND circuit for ANDing said input clock, the frequency divided clock(s) other than the frequency divided clock with the largest division value and the output of said inverter;

a first switch with a control terminal supplied with the output of said first AND circuit for controlling the on/off of a discharge path of a first capacitor;

a second switch with a control terminal supplied with the output of said second AND circuit for controlling the on/off of a discharge path of a second capacitor, wherein said first and second capacitors are charged by a power supply when said first and said second switches are turned off, respectively;

a first waveform-shaping buffer circuit supplied with a terminal voltage of said first capacitor;

a second waveform-shaping buffer circuit supplied with a terminal voltage of said second capacitor; and a selection circuit supplied with the outputs of said first and second waveform-shaping buffer circuits for selectively outputting one of these outputs based on a selection control signal obtained by delaying the output of said inverter by a predetermined length of time in said delay circuit.

8. The clock interruption detection circuit according to claim 7 wherein said selection circuit switches the selection of the outputs of said first and second waveform-shaping buffer circuits at intervals of a plurality of clock periods of said input clock.

9. A clock interruption detection circuit comprising:

a frequency divider circuit supplied with an input clock for generating a frequency divided clock with a predetermined division value;

a first AND circuit for ANDing said input clock and said frequency divided clock;

a first and a second capacitor each connected at one end with a higher-potential power supply via a first and a second resistor, respectively, and at other end with a lower-potential power supply;

an inverter for inverting the frequency divided clock;

a second AND circuit for ANDing said input clock and an output of said inverter;

a first switch connected to a junction of said first capacitor and said first resistor and to said lower-potential power supply, wherein the turn on/off of said first switch is controlled based on an output of said first AND circuit;

a second switch connected to a junction of said second capacitor and said second resistor and to said lower-potential power supply, wherein the turn on/off of said second switch is controlled based on an output of said second AND circuit;

a first waveform-shaping buffer circuit supplied with a terminal voltage of said first capacitor;

a second waveform-shaping buffer circuit supplied with a terminal voltage of said second capacitor; and a selection circuit supplied with outputs of said first and second waveform-shaping buffer circuits for selectively outputting one of these outputs in accordance with a selection control signal obtained by delaying the output of said inverter for a predetermined length of time by said delay circuit.

10. The clock interruption detection circuit according to claim 9, wherein said frequency divider circuit outputs a ½ frequency divided clock by dividing said input clock by 2, and wherein the ½ clock is inverted by said inverter and then delayed by one half said input clock in said delay circuit to produce said selection control signal.

11. A clock interruption detection circuit comprising:

a frequency dividing circuit for outputting a plurality of frequency divided clocks by dividing an input clock with different division values;

a first AND circuit for ANDing said input clock and the plurality of frequency divided clocks;

an inverter for inverting one of the frequency divided clocks with the largest division value;

a second AND circuit for ANDing said input clock, the frequency divided clock(s) other than the frequency divided clock with the largest division value and the output of said inverter;

a first switch with a control terminal supplied with the output of said first AND circuit for controlling the on/off of a discharge path of a first capacitor;

a second switch with a control terminal supplied with the output of said second AND circuit for controlling the on/off of a discharge path of a second capacitor, wherein said first and said second capacitors are charged by a power supply when said first and said second switches are turned off, respectively;

a first waveform-shaping buffer circuit supplied with a terminal voltage of said first capacitor;

a second waveform-shaping buffer circuit supplied with a terminal voltage of said second capacitor; and an OR circuit for ORing the outputs of said first and second waveform-shaping buffer circuits and outputting the result of the operation.

12. The clock interruption detection circuit according to claim 11, wherein said OR circuit switches the selection of the outputs of said first and second waveform-shaping buffer circuits at intervals of a plurality of clock periods of said input clock.

* * * * *